US010099694B2

(12) United States Patent
Takahashi

(10) Patent No.: US 10,099,694 B2
(45) Date of Patent: Oct. 16, 2018

(54) MOTOR VEHICLE

(71) Applicant: TOYOTA JIDOSHA KABUSHIKI KAISHA, Toyota-shi, Aichi-ken (JP)

(72) Inventor: Yoshimitsu Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 14/932,172

(22) Filed: Nov. 4, 2015

(65) Prior Publication Data

US 2016/0129911 A1 May 12, 2016

(30) Foreign Application Priority Data

Nov. 7, 2014 (JP) .................. 2014-227131

(51) Int. Cl.
| | |
|---|---|
| *B60W 30/18* | (2012.01) |
| *B60W 10/08* | (2006.01) |
| *B60W 10/26* | (2006.01) |
| *B60L 3/10* | (2006.01) |
| *B60W 20/15* | (2016.01) |
| *B60K 6/445* | (2007.10) |
| *B60K 6/448* | (2007.10) |
| *B60K 6/52* | (2007.10) |

(52) U.S. Cl.
CPC ....... *B60W 30/18172* (2013.01); *B60K 6/445* (2013.01); *B60K 6/448* (2013.01); *B60K 6/52* (2013.01); *B60L 3/106* (2013.01); *B60W 10/08* (2013.01); *B60W 10/26* (2013.01); *B60W 20/15* (2016.01); *B60W 2520/26* (2013.01); *B60W 2540/10* (2013.01); *B60W 2710/083* (2013.01); *B60W 2710/242* (2013.01); *B60W 2720/403* (2013.01); *Y02T 10/6239* (2013.01); *Y02T 10/6243* (2013.01); *Y02T 10/6265* (2013.01); *Y02T 10/7258* (2013.01)

(58) Field of Classification Search
None
See application file for complete search history.

(56) References Cited

U.S. PATENT DOCUMENTS

| | | | | |
|---|---|---|---|---|
| 5,171,294 | A | * 12/1992 | Takano | B60K 17/3462 180/248 |
| 6,549,840 | B1 | * 4/2003 | Mikami | B60K 6/365 180/243 |
| 2005/0099146 | A1 | 5/2005 | Nishikawa et al. | |
| 2008/0289894 | A1 | * 11/2008 | Muta | B60K 6/445 180/248 |

FOREIGN PATENT DOCUMENTS

| | | | |
|---|---|---|---|
| JP | 2005-151633 A | 6/2005 | |
| JP | 2006-248319 A | 9/2006 | |
| JP | 2007161032 A | * 6/2007 | ........... B60G 17/016 |

* cited by examiner

*Primary Examiner* — Rami Khatib
*Assistant Examiner* — Jason R Roberson
(74) *Attorney, Agent, or Firm* — Oliff PLC

(57) ABSTRACT

A motor vehicle is controlled: during a prescribed transition from an accelerator ON state to an accelerator OFF and brake OFF state, the control unit makes a rear wheel distribution ratio that is a ratio of a torque of the rear wheel to a sum of a torque of the front wheel and the torque of the rear wheel, change to a first prescribed distribution ratio after changing from a value during the accelerator ON state to a second prescribed distribution ratio that is larger than the first prescribed distribution ratio.

8 Claims, 8 Drawing Sheets

MOTOR VEHICLE

INCORPORATION BY REFERENCE

The disclosure of Japanese Patent Application No. 2014-227131 filed on Nov. 7, 2014 including the specification, drawings and abstract is incorporated herein by reference in its entirety.

BACKGROUND OF THE INVENTION

1. Field of the Invention

The invention relates to a motor vehicle and, in particular, to a motor vehicle that includes a motor for a front wheel that can input motive power to the front wheel and can receive motive power output from the front wheel, a motor for a rear wheel that can input motive power to the rear wheel and can receive motive power output from the rear wheel, and a battery that can transfer electric power to or receive electric power from the motor for the front wheel and the motor for the rear wheel.

2. Description of Related Art

In the past, as for such a motor vehicle, a following structure is put forward: the motor vehicle includes an engine; a first motor; a power distribution comprehensive mechanism (planetary gear mechanism) that has a ring gear, a carrier and a sun gear connected with a drive shaft connected to a front wheel, an output shaft of the engine and a rotating shaft of the first motor; a second motor that can input motive power to the drive shaft and receive motive power output from the drive shaft; a third motor that can input motive power to the rear wheel and receive motive power output from the rear wheel; and a battery that can transfer electric power to or receive electric power from the first motor, the second motor and the third motor (see Japanese Patent Application Publication No. 2006-248319 (JP 2006-248319 A), for example). In this motor vehicle, a rear wheel demand distribution ratio serving as a demand value of a ratio of a torque of the rear wheel to a sum of a torque of the front wheel and the torque of the rear wheel is set in accordance with whether or not a slip occurs, whether or not it is a time of a start and emergency acceleration, or whether or not it is a time of a travel at a decelerated speed, the torque for the front wheel and the torque for the rear wheel are set based on the set rear wheel demand distribution ratio, and the engine, the first motor, the second motor and the third motor are controlled so as to output the set torque for the front wheel to the front wheel and output the set torque for the rear wheel to the rear wheel. Thereafter, the rear wheel demand distribution ratio is specifically set so as to suppress the slip during the occurrence of the slip, set to, for example, 0.2 or 0.3, so as to make a starting performance and an accelerating performance become good during the start and emergency acceleration, set to, for example, 0.5 or 0.4, so as make electric power obtained through a regenerative drive of a motor MG2 and a motor MG3 become more during the travel at the decelerated speed, and set to a value 0 in other circumstances than the above-mentioned ones.

In such a motor vehicle, during a prescribed transition from an accelerator ON state to an accelerator OFF and brake OFF state, a demand of the vehicle changes from a drive demand to a brake demand, so the vehicle is likely to become a forward tilt posture. In the above-mentioned motor vehicle, during the prescribed transition, if the rear wheel demand distribution ratio is made to directly change from a value (a value 0 or 0.2, 0.3, etc.) during the accelerator ON state to a value (0.5, 0.4, etc.) during the accelerator OFF and brake OFF state, it is possible that the vehicle becoming the forward tilt posture cannot be sufficiently suppressed.

SUMMARY OF THE INVENTION

The invention provides the motor vehicle which suppresses the vehicle becoming a forward tilt posture during a prescribed transition from an accelerator ON state to an accelerator OFF and brake OFF state.

The motor vehicle according to one aspect of the invention, includes: a motor for a front wheel that is configured to input motive power to the front wheel and receive motive power output from the front wheel; a motor for a rear wheel that is configured to input motive power to the rear wheel and receive motive power output from the rear wheel; a battery that is configured to transfer electric power to or receive electric power from the motor for the front wheel and the motor for the rear wheel; and a control unit that is configured to control the motor for the front wheel and the motor for the rear wheel so as to travel through a demand torque corresponding to an accelerator operation and a brake operation. During a prescribed transition from an accelerator ON state to an accelerator OFF and brake OFF state, the control unit makes a rear wheel distribution ratio that is a ratio of a torque of the rear wheel to a sum of a torque of the front wheel and the torque of the rear wheel, change to a first prescribed distribution ratio after changing from a value during the accelerator ON state to a second prescribed distribution ratio that is larger than the first prescribed distribution ratio.

In the motor vehicle of the above aspect of the invention, the motor for the front wheel and the motor for the rear wheel are controlled so as to travel through the demand torque corresponding to the accelerator operation and the brake operation. Moreover, during the prescribed transition from the accelerator ON state to the accelerator OFF and brake OFF state, the ratio of the torque of the rear wheel to the sum of the torque of the front wheel and the torque of the rear wheel, i.e., the rear wheel distribution ratio, is made to change to the first prescribed distribution ratio after changing from the value during the accelerator ON state to the second prescribed distribution ratio. The second prescribed distribution ratio is larger than the first prescribed distribution ratio. That is, during the prescribed transition, the rear wheel distribution ratio is made to change to the first prescribed distribution ratio smaller than the second prescribed distribution ratio after changing from the value during the accelerator ON state (a value immediately before the prescribed transition) to the larger second prescribed distribution ratio. During the prescribed transition, a demand of the vehicle changes from a drive demand to a brake demand, so the vehicle is likely to become a forward tilt posture. Thus, the rear wheel distribution ratio is made to change to the first prescribed distribution ratio after changing from the value during the accelerator ON state to the second prescribed distribution ratio, so the vehicle becoming the forward tilt posture can be further suppressed as compared with a circumstance where the rear wheel distribution ratio directly changes from a distribution ratio smaller than the first prescribed distribution ratio to the first prescribed distribution ratio.

In such the motor vehicle of the above aspect, the first prescribed distribution ratio may be a distribution ratio determined in accordance with a gravity center position of the vehicle during parking. In this case, a travel posture of the vehicle can be made to be more stable.

Moreover, in the motor vehicle of the above aspect, a value of the second prescribed distribution ratio may be 1. In this case, the vehicle becoming the forward tilt posture can be further suppressed.

Moreover, in the motor vehicle of the above aspect, during the prescribed transition, the control unit may make the rear wheel distribution ratio change from the second prescribed distribution ratio to the first prescribed distribution ratio by a second change degree smaller than a first change degree after changing from the value during the accelerator ON state to the second prescribed distribution ratio by the first change degree. In this case, reduction of stability of the travel posture of the vehicle can be further suppressed.

In addition, in the motor vehicle of the above aspect, the motor vehicle may include a braking force application device that can apply a braking force generated based on a hydraulic pressure to the front wheel and the rear wheel, during a brake ON state, the control unit may control the motor for the front wheel, the motor for the rear wheel and the braking force application device so as to travel through the demand torque, and when the brake ON state takes place after the prescribed transition, the control unit may keep the rear wheel distribution ratio to be a value immediately before the brake ON state. By keeping the rear wheel distribution ratio in this way, production of an undesirable circumstance caused by the change of the rear wheel distribution ratio, e.g., an undesirable circumstance where the control of the braking force application device cannot sufficiently follow an instruction value, can be suppressed.

In the motor vehicle of the above aspect, the motor vehicle may include: an engine; a generator; and a planetary gear having three rotary elements connected with a drive shaft for the front wheel connected to the front wheel, an output shaft of the engine and a rotating shaft of the generator.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Next, embodiments are used to describe modes for carrying out the invention.

Figure 1:
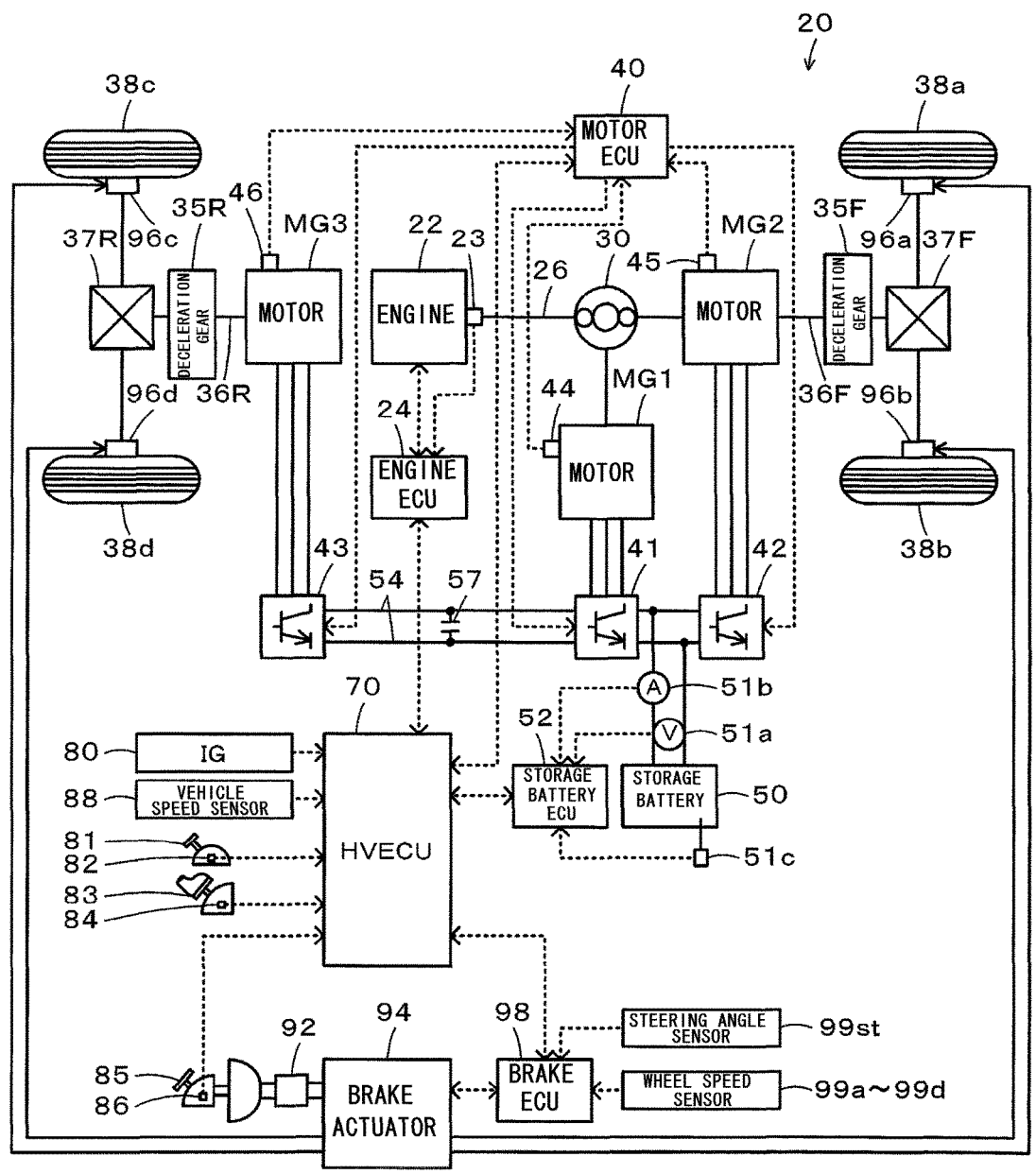
FIG. 1 is a schematic structure diagram showing a structure of a hybrid vehicle 20 serving as an embodiment of the invention.

FIG. 1 is a schematic structure diagram showing a structure of a hybrid vehicle 20 serving as an embodiment of the invention. As shown in the figure, the hybrid vehicle 20 of the embodiment includes an engine 22, a planetary gear 30, motors MG1, MG2, MG3, inverters 41, 42, 43, a battery 50, a brake actuator 94, and a hybrid electronic control unit (hereinafter referred to as an HVECU) 70.

The engine 22 is formed as an internal combustion engine that outputs motive power by using gasoline, diesel fuel or the like as fuel. A running control of the engine 22 is performed by an electronic control unit for an engine (hereinafter referred to as an engine ECU) 24.

Although not shown in the figure, the engine ECU 24 is formed as a microprocessor that uses a CUP as a main member, and in addition to the CPU, the microprocessor further includes an ROM for storing a processing program, an RAM for temporarily storing data, input and output ports, and a communication port. Signals from various sensors required to perform the running control of the engine 22, e.g., a crankshaft angle θcr from a crankshaft position sensor 23 for detecting a rotation position of a crankshaft 26, are input into the engine ECU 24 via the input port. Moreover, various control signals for performing the running control of the engine 22, e.g., a drive signal to a fuel injection valve, a drive signal to a throttle valve motor for adjusting a position of a throttle valve, a control signal to an ignition coil integrated with an igniter, are output from the engine ECU 24 via the output port. The engine ECU 24 calculates a rotation speed of the crankshaft 26, i.e., a rotation speed Ne of the engine 22, based on the crankshaft angle θcr detected by the crankshaft position sensor 23. The engine ECU 24 is connected with the HVECU 70 via the communication port, performs the running control of the engine 22 in accordance with a control signal from the HVECU 70, and outputs data associated with a running state of the engine 22 to the HVECU 70 as required.

The planetary gear 30 is formed as a planetary gear mechanism of a single pinion type. A rotor of the motor MG1 is connected to a sun gear of the planetary gear 30. A drive shaft 36F connected with front wheels 38a, 38b via a differential gear 37F is connected to a ring gear of the planetary gear 30. The crankshaft 26 of the engine 22 is connected to a carrier of the planetary gear 30.

The motor MG1 is formed as, for example, a synchronous generator motor, and as mentioned above, the rotor is connected with the sun gear of the planetary gear 30. The motor MG2 is formed as, for example, a synchronous generator motor, and a rotor is connected with the drive shaft 36F. The motor MG3 is formed as, for example, a synchronous generator motor, and is connected with a drive shaft 36R connected with rear wheels 38c, 38d via a differential gear 37R. An on-off control of a switch element, which is not shown, of the inverter 41, 42, 43 is performed by an electronic control unit for a motor (hereinafter referred to as a motor ECU) 40, thereby driving the motor MG1, MG2, MG3 to rotate. A capacitor 57 for smoothing is connected to a power line 54 for connecting the inverters 41, 42, 43 with the battery 50.

Although not shown in the figure, the motor ECU 40 is formed as a microprocessor that uses a CUP as a main member, and in addition to the CPU, the microprocessor further includes an ROM for storing a processing program, an RAM for temporarily storing data, input and output ports, and a communication port. Signals from various sensors required to perform a drive control of the motor MG1, MG2, MG3, e.g., a rotation position θm1, θm2, θm3 from a rotation position detection sensor 44, 45, 46 for detecting a rotation position of a rotor of the motor MG1, MG2, MG3, a phase current from a current sensor for detecting a current flowing in a respective phase of the motor MG1, MG2, MG3, are input into the motor ECU 40 via the input port. An on-off control signal to the switch element, which is not shown, of the inverter 41, 42, 43 and the like are output from the motor ECU 40 via the output port. The motor ECU 40 calculates a rotation speed Nm1, Nm2, Nm3 of the motor MG1, MG2, MG3 based on the rotation position θm1, θm2, θm3 of the rotor of the motor MG1, MG2, MG3 detected by the rotation position detection sensor 44, 45, 46. The motor ECU 40 is connected with the HVECU 70 via the communication port, performs the drive control of the motor MG1, MG2, MG3 in accordance with a control signal from the HVECU 70, and outputs data associated with a drive state of the motor MG1, MG2, MG3 to the HVECU 70 as required.

The battery 50 is formed as, for example, a lithium-ion secondary battery or a nickel-metal hydride secondary battery, and transfers electric power to or receives electric power from the motors MG1, MG2, MG3 via the inverters 41, 42, 43. The battery 50 is managed by an electronic control unit for a battery (hereinafter referred to as a battery ECU) 52.

Although not shown in the figure, the battery ECU 52 is formed as a microprocessor that uses a CUP as a main member, and in addition to the CPU, the microprocessor further includes an ROM for storing a processing program, an RAM for temporarily storing data, input and output ports, and a communication port. Signals required to manage the battery 50, e.g., a battery voltage VB from a voltage sensor 51a disposed between terminals of the battery 50, a battery current IB from a current sensor 51b installed on an output terminal of the battery 50, a battery temperature TB from a temperature sensor 51c installed on the battery 50, are input into the battery ECU 52 via the input port. In order to manage the battery 50, the battery ECU 52 calculates a ratio of a capacity of electric power that can perform an electric discharge from the battery 50 at this time to an entire capacity, i.e., a state of charge SOC, based on an accumulated value of the battery current IB detected by the current sensor 51b, or calculates allowed input and output electric power, i.e., input and output limits Win, Wout, that can perform an electric charge or discharge of the battery 50 based on the calculated state of charge SOC and the battery temperature TB detected by the temperature sensor 51c. The battery ECU 52 is connected with the HVECU 70 via the communication port, and outputs data associated with a state of the battery 50 to the HVECU 70 as required.

The brake actuator 94 is formed as an actuator for applying a braking force to the front wheels 38a, 38b or the rear wheels 38c, 38d. To be specific, the brake actuator 94 is formed to be able to set a braking force acting on the vehicle in accordance with a pressure (braking pressure) of a master cylinder 92 produced corresponding to a step-in of a brake pedal 85 and a vehicle speed V, a hydraulic pressure of a brake wheel cylinder 96a, 96b, 96c, 96d is adjusted so that a braking force corresponding to a sharing amount of the brake in the braking force acts on the front wheels 38a, 38b or the rear wheels 38c, 38d, or the hydraulic pressure to the brake wheel cylinder 96a, 96b, 96c, 96d is adjusted independently of the step-in of the brake pedal 85 so that the braking force acts on the front wheels 38a, 38b or the rear wheels 38c, 38d. Hereinafter, the braking force that acts on the front wheels 38a, 38b or the rear wheels 38c, 38d by means of operation of the brake actuator 94 is sometimes called a hydraulic brake. A drive control of the brake actuator 94 is performed by an electronic control unit for a brake (hereinafter referred to as a brake ECU) 98.

Although not shown in the figure, the brake ECU 98 is formed as a microprocessor that uses a CUP as a main member, and in addition to the CPU, the microprocessor further includes an ROM for storing a processing program, an RAM for temporarily storing data, input and output ports, and a communication port. Signals from various sensors required to perform the drive control of the brake actuator 94, e.g., a master cylinder pressure (brake stepping force Fb) detected by a pressure sensor, which is not shown, installed on the master cylinder 92, wheel speeds Vwa-Vwd from wheel speed sensors 99a-99d installed on the front wheels 38a, 38b or the rear wheels 38c, 38d, a steering angle θst from a steering angle sensor 99st, are input into the brake ECU 98 via the input port. A drive control signal and the like to the brake actuator 94 are output from the brake ECU 98 via the output port. The brake ECU 98 is connected with the HVECU 70 via the communication port, performs the drive control of the brake actuator 94 in accordance with a control signal from the HVECU 70, or outputs data associated with a state of the brake actuator 94 to the HVECU 70 as required. The brake ECU 98 inputs a signal such as the wheel speeds Vwa-Vwd from the front wheels 38a, 38b or the rear wheels 38c, 38d of the wheel speed sensors 99a-99d, and the steering angle θst from the steering angle sensor 99st, and performs a vehicle behavior stabilization control such as an anti-lock braking device function (ABS) that prevents any one of the front wheels 38a, 38b and the rear wheels 38c, 38d from slipping due to a lock when a driver steps in the brake pedal 85, a traction control (TRC) that prevents any one of the front wheels 38a, 38b from slipping due to idling when the driver steps in an accelerator pedal 83, and a vehicle stability control (VSC) that keeps a posture when the vehicle is turning.

Although not shown in the figure, the HVECU 70 is formed as a microprocessor that uses a CUP as a main member, and in addition to the CPU, the microprocessor further includes an ROM for storing a processing program, an RAM for temporarily storing data, input and output ports, and a communication port. An ignition signal from an ignition switch 80, a shift position SP from a shift position sensor 82 for detecting an operation position of a shifting lever 81, an accelerator opening Acc from an accelerator pedal position sensor 84 for detecting a step-in amount of the accelerator pedal 83, a brake pedal position BP from a brake pedal position sensor 86 for detecting a step-in amount of the brake pedal 85, a vehicle speed V from a vehicle speed sensor 88, etc. are input into the HVECU 70 via the input port. As mentioned above, the HVECU 70 is connected with the engine ECU 24, the motor ECU 40 and the battery ECU 52 via the communication port, and exchanges various control signals and data with the engine ECU 24, the motor ECU 40 and the battery ECU 52. According to the present embodiment, a state in which the step-in amount of the accelerator pedal 83 is not zero corresponds to "accelerator ON state", and a state in which the step-in amount of the accelerator pedal 83 is zero corresponds to "accelerator OFF state". Also, a state in which the step-in amount of the brake pedal 85 is not zero corresponds to "brake ON state", and a state in which the step-in amount of the brake pedal 85 is zero corresponds to "brake OFF state".

The hybrid vehicle 20 of the embodiment formed in this way travels in a hybrid travel mode (HV travel mode) where the vehicle travels together with running of the engine 22 or in an electric travel mode (EV travel mode) where the vehicle travels with the running of the engine 22 being stopped.

During a travel in the HV travel mode in the accelerator ON state, the HVECU 70 firstly sets a basic demand torque Tdtmp serving as a basic value of a demand torque Td* which the vehicle is demanded to provide, based on the accelerator opening Acc from the accelerator pedal position sensor 84 and the vehicle speed V from the vehicle speed sensor 88. Next, the basic demand torque Tdtmp is subjected to a rate processing to set the demand torque Td*.

Next, a rear wheel basic distribution ratio Drtmp serving as a basic value of a rear wheel demand distribution ratio Dr* is set based on an acceleration a and the like. Next, the rear wheel basic distribution ratio Drtmp is subjected to a rate processing or a slow change processing such as a smoothing processing to set the rear wheel demand distribution ratio Dr*. Then, the rear wheel demand distribution ratio Dr* is subtracted from a value 1 to set a front wheel demand distribution ratio Df*. Here, the rear wheel demand distribution ratio Dr* and the front wheel demand distribution ratio DP are respectively demand values of the ratio of the torque of the rear wheels 38c, 38d to a sum of the torque of the front wheels 38a, 38b and the torque of the rear wheels 38c, 38d and the ratio of the front wheels 38a, 38b to the sum of the torque of the front wheels 38a, 38b and the torque of the rear wheels 38c, 38d. In the embodiment, the rear wheel basic distribution ratio Drtmp is set to one that is comparatively small (e.g., about 0-0.5), and is inclined to be larger as the acceleration a gets larger. This is to improve a travel performance during acceleration. The acceleration a can use, for example, a value detected by an acceleration sensor that is not shown or a variation of the vehicle speed V per unit time.

After the rear wheel demand distribution ratio Dr* and the front wheel demand distribution ratio DP are set in this way, the demand torque Td* is multiplied by the front wheel demand distribution ratio DP or the rear wheel demand distribution ratio Dr* to calculate a front wheel demand torque Tf* or a rear wheel demand torque Tr* which the front wheels 38a, 38b or the rear wheels 38c, 38d are demanded to provide.

Next, as shown in Formula (1) below, demand power Pe* which the engine 22 is demanded to provide is calculated by subtracting charge and discharge demand power Pb* of the battery 50 (a value that is positive when performing an electric discharge from the battery 50) from a sum of a value (Tf*/Gf·Nm2) obtained by multiplying a value (Tf*/Gf) obtained by dividing the front wheel demand torque Tf* by a gear ratio Gf of a deceleration gear 35F by the rotation speed Nm2 (the rotation speed of the drive shaft 36F) of the motor MG2 and a value (Tr*/Gr·Nm3) obtained by multiplying a value (Tr*/Gr) obtained by dividing the rear wheel demand torque Tr* by a gear ratio Gr of a deceleration gear 35R by the rotation speed Nm3 (the rotation speed of the drive shaft 36R) of the motor MG3. Here, the values (Tf*/Gf), (Tr*/Gr) refer to torques which the drive shafts 36F, 36R are demanded to provide. Moreover, the values (Tf*/Gf·Nm2), (Tr*/Gr·Nm3) refer to power which the drive shafts 36F, 36R are demanded to provide.

$$Pe^* = Tf^*/Gf \cdot Nm2 + Tr^*/Gr \cdot Nm3 - Pb^* \tag{1}$$

After the demand power Pe* of the engine 22 is calculated in this way, a target rotation speed Ne* and a target torque Te* of the engine 22 are set based on the calculated demand power Pe* and an action line that makes the engine 22 act efficiently. Next, a torque instruction Tm1*, Tm2*, Tm3* of the motor MG1, MG2, MG3 is set within the input and output limits Win, Wout of the battery 50. The torque instruction Tm1* of the motor MG1 is set so as to make the engine 22 rotate at the target rotation speed Ne*. The torque instruction Tm2* of the motor MG2 is set so as to output the value (Tf*/Gf) to the drive shaft 36F, i.e., to output the front wheel demand torque Tf* to the front wheels 38a, 38b. The torque instruction Tm3* of the motor MG3 is set so as to output the value (Tr*/Gr) to the drive shaft 36R, i.e., to output the rear wheel demand torque Tr* to the rear wheels 38c, 38d.

Moreover, the target rotation speed Ne* or the target torque Te* of the engine 22 is transmitted to the engine ECU 24, and the torque instruction Tm1*, Tm2*, Tm3* of the motor MG1, MG2, MG3 is transmitted to the motor ECU 40. The engine ECU 24 that receives the target rotation speed Ne* and the target torque Te* of the engine 22 performs an air intake amount control, a fuel injection control, an ignition control and the like of the engine 22 so as to make the engine 22 run based on the target rotation speed Ne* and the target torque Te*. Moreover, the motor ECU 40 that receives the torque instruction Tm1*, Tm2*, Tm3* of the motor MG1, MG2, MG3 performs an on-off control of the switch element of the inverter 41, 42, 43 so as to drive the motor MG1, MG2, MG3 in accordance with the torque instruction Tm1*, Tm2*, Tm3*.

During a travel in the EV travel mode in the accelerator ON state, like that during the travel in the HV travel mode in the accelerator ON state, the HVECU 70 also sets the demand torque Td*, the front wheel demand distribution ratio DP and the rear wheel demand distribution ratio Dr*, and the front wheel demand torque Tf* and the rear wheel demand torque Tr*. Next, the torque instruction Tm1* of the motor MG1 is set to a value 0. Moreover, the torque instruction Tm2*, Tm3* of the motor MG2, MG3 is set within the input and output limits Win, Wout of the battery 50. The torque instruction Tm2* of the motor MG2 is set so as to output the value (Tf*/Gf) to the drive shaft 36F, i.e., to output the front wheel demand torque Tf* to the front wheels 38a, 38b. The torque instruction Tm3* of the motor MG3 is set so as to output the value (Tr*/Gr) to the drive shaft 36R, i.e., to output the rear wheel demand torque Tr* to the rear wheels 38c, 38d. Moreover, the torque instruction Tm1*, Tm2*, Tm3* of the motor MG1, MG2, MG3 is transmitted to the motor ECU 40. The motor ECU 40 that receives the torque instruction Tm1*, Tm2*, Tm3* of the motor MG1, MG2, MG3 performs an on-off control of the switch element of the inverter 41, 42, 43 so as to drive the motor MG1, MG2, MG3 in accordance with the torque instruction Tm1*, Tm2*, Tm3*.

Figure 2:
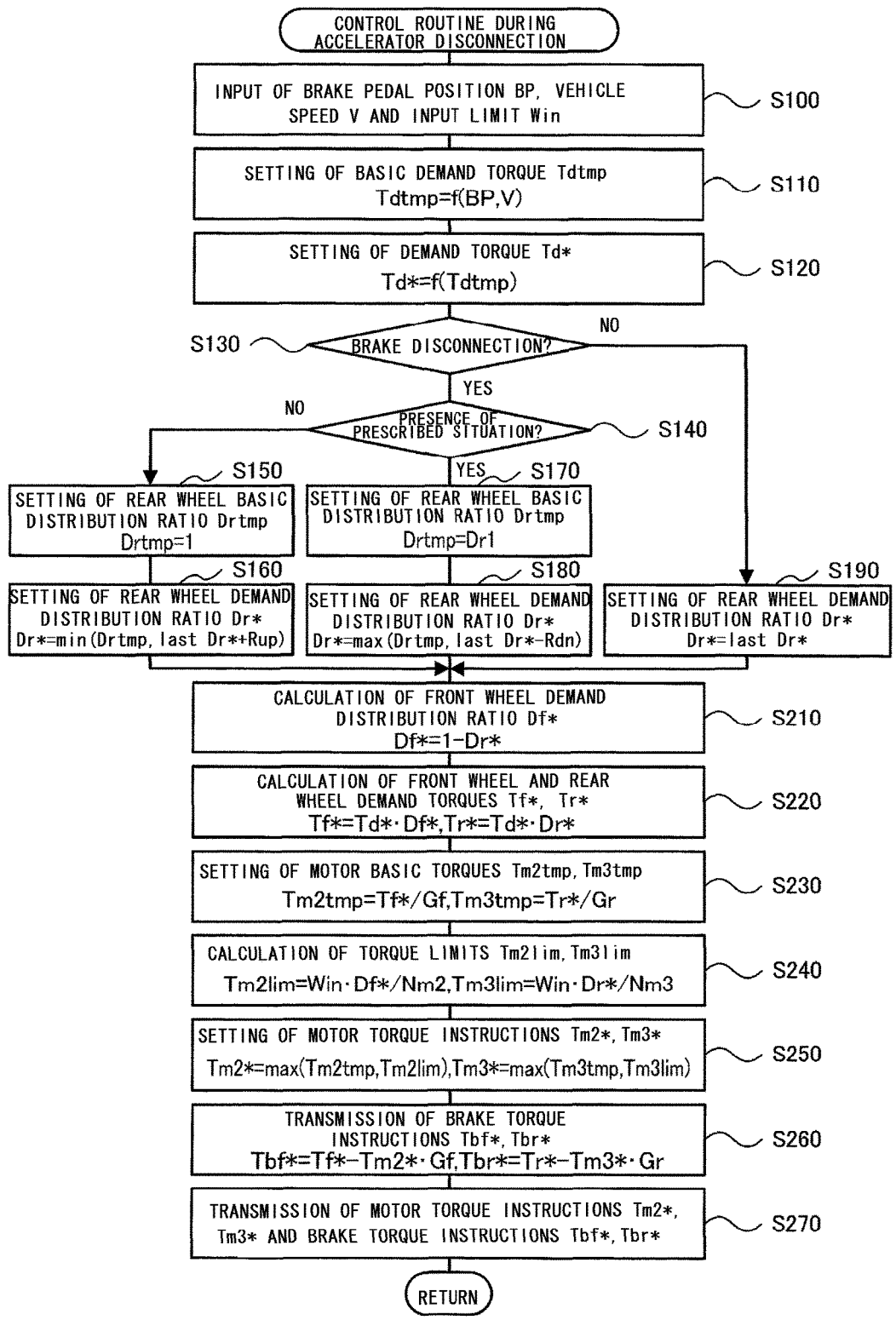
FIG. 2 is a flowchart showing an example of a control routine during an accelerator OFF state performed by an HVECU 70 of the embodiment.

Next, an action of the hybrid vehicle 20 of the embodiment formed in this way, in particular an action during the accelerator OFF state, is described. FIG. 2 is a flowchart showing an example of a control routine during the accelerator OFF state performed by an HVECU 70 of the embodiment. This routine is performed repeatedly per prescribed time (e.g., every several milliseconds) during the accelerator OFF state. It should be noted that during the accelerator OFF state, concurrently with the routine, the HVECU 70 transmits the control instruction to the engine ECU 24 so as to make the engine 22 keep running or stop running, and sets the torque instruction Tm1* of the motor MG1 to the value 0 and transmits it to the motor ECU 40. Then, the engine ECU 24 that receives the control instruction performs the air intake amount control, the fuel injection control, the ignition control and the like of the engine 22 so as to make the engine 22 keep running at a prescribed speed (e.g., 1000 rpm or 1200 rpm), or makes the engine 22 stop running. Moreover, the motor ECU 40 that receives the torque instruction Tm1* of the motor MG1 performs an on-off control of the switch element of the inverter 41 so as to drive the motor MG1 in accordance with the torque instruction Tm1*.

When a control routine during the accelerator OFF state is performed, data such as the brake pedal position BP, the vehicle speed V, and the input limit Win of the battery 50 is firstly input into the HVECU 70 (Step S100). Here, a value detected by the brake pedal position sensor 86 is input as the brake pedal position BP. A value detected by the vehicle speed sensor 88 is input as the vehicle speed V. A value set in accordance with the battery temperature TB detected by the temperature sensor 51c and the state of charge SOC of the battery 50 based on the accumulated value of the battery current IB detected by the current sensor 51b is input from the battery ECU 52 through communication as the input limit Win of the battery 50.

Figure 3:
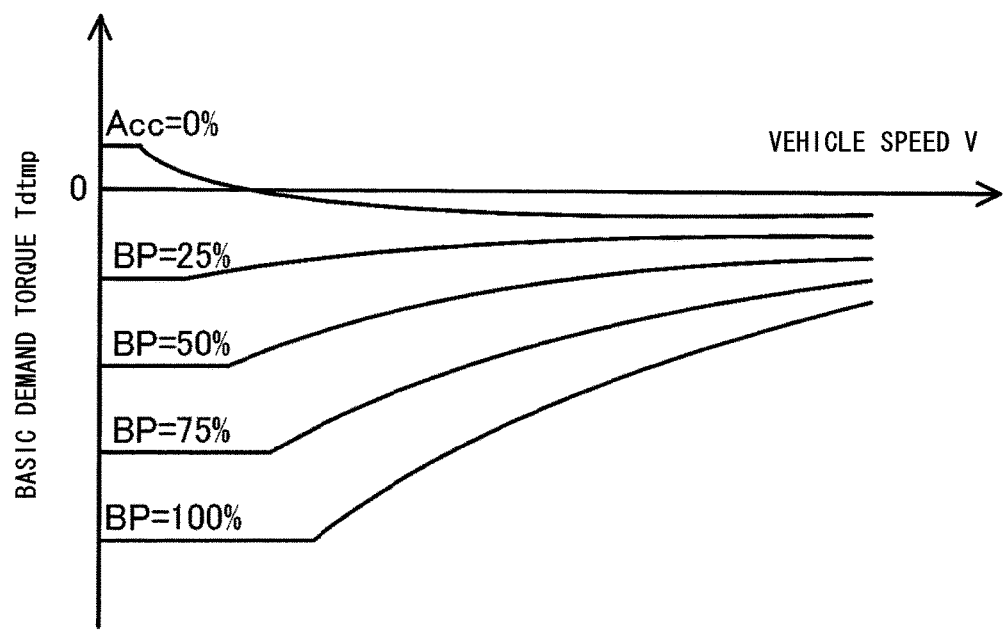
FIG. 3 is an explanatory view showing an example of a mapping for setting a basic demand torque.

After the data is input in this way, the basic demand torque Tdtmp is set based on the brake pedal position BP and the vehicle speed V that are input (Step S110). Here, in the embodiment, a relationship among the brake pedal position BP, the vehicle speed V and the basic demand torque Tdtmp is predetermined and is stored beforehand in the ROM that is not shown as a mapping for setting the basic demand torque, and when the brake pedal position BP and the vehicle speed V are provided, the corresponding basic demand torque Tdtmp is derived in accordance with the stored mapping to set the basic demand torque Tdtmp. An example of the mapping for setting the basic demand torque is as shown in FIG. 3. It should be noted that under a circumstance where the basic demand torque Tdtmp is negative, it means that a braking torque is demanded. Under this circumstance, a negative torque, i.e., a braking (regenerative) torque, is output from the motor MG2 or the motor MG3.

Next, as shown in Formula (2) below, the basic demand torque Tdtmp is subjected to a rate processing using a rate value Tdlim to set the demand torque Td* (S120). Here, the rate value Tdlim uses a value that can make the demand torque Td* rapidly and smoothly follow the basic demand torque Tdtmp to an extent when the basic demand torque Tdtmp changes by taking riding feeling of the driver and the like into consideration. It should be noted that the rate value Tdlim can use the same value during the accelerator OFF and brake OFF state (during the coast down) and during the accelerator OFF and brake ON state, or use a larger value during the accelerator OFF and brake ON state than that during the accelerator OFF and brake OFF state.

$$Td^* = \max(\min(Tdtmp, \text{last } Td^* + Tdlim), \text{last } Td^* - Tdlim) \quad (2)$$

Next, it is judged whether the state is the brake OFF state or the brake ON state (Step S130), and during the brake OFF state, it is judged whether or not a prescribed situation described below is present (Step S140). When it is judged that the prescribed situation is not present, the rear wheel basic distribution ratio Drtmp is set to the value 1 (Step S150). Moreover, as shown in Formula (3) below, the rear wheel basic distribution ratio Drtmp is subjected to a rate processing using a rate value Rup to set the rear wheel demand distribution ratio Dr* (S160). In Formula (3), under a circumstance where the processing in Step S160 is performed for the first time among the repeated performances of the routine (under a circumstance immediately after the prescribed transition is performed), the "last Dr*" uses the rear wheel demand distribution ratio Dr* immediately before the prescribed transition (during the accelerator ON state), and under a circumstance of the second time or later, the "last Dr*" uses a value set when the routine is performed last time.

$$Dr^* = \min(Drtmp, \text{last } Dr^* + Rup) \quad (3)$$

Here, the prescribed situation in Step S140 is a situation where after the prescribed transition from the accelerator ON state to the accelerator OFF and brake OFF state (a coast down), the brake ON state does not take place, and the rear wheel demand torque Tr*(=Td*·Dr*) reaches a value (Tdtmp·Drtmp) obtained by multiplying the basic demand torque Tdtmp by the rear wheel basic distribution ratio Drtmp (the value 1 under this circumstance).

Moreover, the processing in Step S160 is a processing that makes the rear wheel demand distribution ratio Dr* increase by the rate value Rup each time toward the value 1 from a value immediately before the prescribed transition (a value during the accelerator ON state) to be kept to be the value 1 corresponding to the repeated performances of the routine. The rate value Rup uses a value determined by means of experiments, analyses or the like so as to make a time required for the rear wheel demand distribution ratio Dr* to change from the value immediately before the prescribed transition to the rear wheel basic distribution ratio Drtmp (the value 1 under this circumstance) be shorter than a time required for the demand torque Td* to change from a value immediately before the prescribed transition to the basic demand torque Tdtmp. Thus, if the routine is performed repeatedly after the prescribed transition, after the rear wheel demand distribution ratio Dr* reaches the value 1, the demand torque Td* reaches the basic demand torque Tdtmp.

After the rear wheel demand distribution ratio Dr* is set in this way, the front wheel demand distribution ratio DP is calculated by subtracting the set rear wheel demand distribution ratio Dr* from the value 1 (Step S210). Next, the demand torque Td* is multiplied by the front wheel demand distribution ratio DP or the rear wheel demand distribution ratio Dr* to calculate the front wheel demand torque TP or the rear wheel demand torque Tr* (Step S220). Then, the front wheel demand torque TP or the rear wheel demand torque Tr* is divided by the gear ratio Gf, Gr of the deceleration gear 35F, 35R to set a basic torque Tm2tmp, Tm3tmp serving as a basic value of the torque instruction Tm2*, Tm3* of the motor MG2, MG3 (Step S230).

Next, as shown in Formulas (4) and (5) below, a value obtained by multiplying the input limit Win of the battery 50 by the front wheel demand distribution ratio DP or the rear wheel demand distribution ratio Dr* is divided by the rotation speed Nm2, Nm3 of the motor MG2, MG3 to calculate a torque limit Tm2lim, Tm3lim of the motor MG2, MG3 (Step S240).

$$Tm2lim = Win \cdot Df^*/Nm2 \quad (4)$$

$$Tm3lim = Win \cdot Dr^*/Nm3 \quad (5)$$

Next, as shown in Formulas (6) and (7) below, the torque limit Tm2*lim*, Tm3*lim* is used to perform a lower limit guard of the basic torque Tm2*tmp*, Tm3*tmp* of the motor MG2, MG3 to set the torque instruction Tm2\*, Tm3\* of the motor MG2, MG3 (Step S250). Then, as shown in Formulas (8) and (9) below, a value obtained by multiplying the torque instruction Tm2\*, Tm3\* of the motor MG2, MG3 by the gear ratio Gf, Gr of the deceleration gear 35F, 35R is subtracted from the front wheel demand torque Tf\* or the rear wheel demand torque Tr\* to calculate a hydraulic brake brake torque instruction Tbf\*, Tbr\* of the front wheels 38*a*, 38*b* or the rear wheels 38*c*, 38*d* (Step S260).

$$Tm2^* = \max(Tm2tmp, Tm2lim) \quad (6)$$

$$Tm3^* = \max(Tm3tmp, Tm3lim) \quad (7)$$

$$Tbf^* = Tf^* - Tm2^* \cdot Gf \quad (8)$$

$$Tbr^* = Tr^* - Tm3^* \cdot Gr \quad (9)$$

After the torque instruction Tm2\*, Tm3\* of the motor MG2, MG3 and the hydraulic brake brake torque instruction Tbf\*, Tbr\* are set in this way, the torque instruction Tm2\*, Tm3\* of the motor MG2, MG3 is transmitted to the motor ECU 40, the hydraulic brake brake torque instruction Tbf\*, Tbr\* is transmitted to the brake ECU 98 (Step S270), and the routine ends. The motor ECU 40 that receives the torque instruction Tm2\*, Tm3\* of the motor MG2, MG3 performs an on-off control of the switch element of the inverter 42, 43 so as to drive the motor MG2, MG3 in accordance with the torque instruction Tm2\*, Tm3\*. The brake ECU 98 that receives the hydraulic brake brake torque instruction Tbf\*, Tbr\* controls the brake actuator 94 so as to make the braking force equivalent to the brake torque instruction Tbf\*, Tbr\* act on the front wheels 38*a*, 38*b* or the rear wheels 38*c*, 38*d*. It should be noted that under a circumstance where the basic torque Tm2*tmp*, Tm3*tmp* of the motor MG2, MG3 is set to the torque instruction Tm2\*, Tm3\*, the hydraulic brake brake torque instruction Tbf\*, Tbr\* is set to the value 0, so the braking force produced by the hydraulic brake is not made to act on the front wheels 38*a*, 38*b* or the rear wheels 38*c*, 38*d*.

In the embodiment, as described above, if the routine is performed repeatedly after the prescribed transition, after the rear wheel demand distribution ratio Dr\* reaches the value 1, the demand torque Td\* reaches the basic demand torque Tdtmp. Thus, after the rear wheel demand distribution ratio Dr\* reaches the value 1, the rear wheel demand torque Tr\* (=Td\*·Drtmp) reaches a value (Tdtmp·Drtmp). In this case, after the rear wheel demand torque Tr\* reaches the value (Tdtmp·Drtmp), when the routine is performed next time or later, and during the brake OFF state in Step S130, it is judged in Step S140 that the prescribed situation is present.

When it is judged in Step S140 that the prescribed situation is present, the rear wheel basic distribution ratio Drtmp is set to a prescribed value Dr1 (Step S170). Here, in the embodiment, the prescribed value Dr1 uses a value determined in accordance with a gravity center position (static load gravity center position) of the vehicle during parking. Under a circumstance where a front side of the vehicle is slightly heavier than a rear side of the vehicle (a circumstance where a load acting on the front wheels 38*a*, 38*b* is slightly larger than a load acting on the rear wheels 38*c*, 38*d*), the prescribed value Dr1 can use, for example, a value 0.6 or a value 0.65.

Next, as shown in Formula (10) below, the rear wheel basic distribution ratio Drtmp is subjected a rate processing using a rate value Rdn to set the rear wheel demand distribution ratio Dr\* (S180), processings in the above-mentioned Steps S210-S270 are performed, and the routine ends. The processing in Step S180 is a processing that makes the rear wheel demand distribution ratio Dr\* decrease by the rate value Rdn each time toward the prescribed value Dr1 from the value 1 to be kept to be the prescribed value Dr1 corresponding to the repeated performances of the routine. The rate value Rdn uses a comparatively small value (a value satisfying a relationship Rup>Rdn>0) in order to further suppress reduction of stability of a travel posture of the vehicle.

$$Dr^* = \max(Drtmp, \text{last } Dr^* - Rdn) \quad (10)$$

In the embodiment, during such a prescribed transition, the rear wheel demand distribution ratio Dr\* is made to change to the prescribed value Dr1 after changing from the value immediately before the prescribed transition to the value 1. During the prescribed transition, a demand of the vehicle changes from a drive demand (the demand torque Td\* is a positive value) to a brake demand (the demand torque Td\* is a negative value), so the vehicle is likely to become a forward tilt posture. In the embodiment, at this time, the rear wheel demand distribution ratio Dr\* is made to change from the value 1 to the prescribed value Dr1 (for example, the value 0.6 or the value 0.65) after changing from the value (about the value 0-the value 0.5) immediately before the prescribed transition to the value 1. Thereby, the vehicle becoming the forward tilt posture can be further suppressed as compared with a circumstance where the rear wheel demand distribution ratio Dr\* is made to directly change from the value immediately before the prescribed transition to the prescribed value Dr1. As a result, the reduction of the stability of the travel posture of the vehicle can be further suppressed. Moreover, by using a value corresponding to the gravity center position (static load gravity center position) of the vehicle during parking as the prescribed value Dr1, when the accelerator OFF and brake OFF state (a state of a coast down) continues, the travel posture of the vehicle can be made to be more stable.

When the state is the brake ON state in Step S130, the rear wheel demand distribution ratio (last Dr\*) set when the routine is performed last time is set to the rear wheel demand distribution ratio Dr\* (Step S190), processings in the above-mentioned Steps S210-S270 are performed, and the routine ends. Thus, if the brake ON state continues, the rear wheel demand distribution ratio Dr\* is kept to be a value immediately before the brake ON state.

During the brake ON state, since the demand torque Td\* is comparatively small (which is comparatively large as an absolute value), the braking force produced by the hydraulic brake is sometimes made to act on the front wheels 38*a*, 38*b* or the rear wheels 38*c*, 38*d*. Basically, a control of the hydraulic brake has a lower responsibility than a control of the motor MG2, MG3. Thus, during the brake ON state, if the rear wheel demand distribution ratio Dr\* is made to change, the control of the hydraulic braking cannot sufficiently follow a change of the hydraulic brake torque instruction Tbf\*, Tbr\* corresponding to the change of the rear wheel demand distribution ratio Dr\*, and it is possible that the stability of the travel posture of the vehicle is reduced. In contrast, in the embodiment, during the brake ON state, the rear wheel demand distribution ratio Dr\* is kept to be the value immediately before the brake ON state, so production of an undesirable circumstance caused by the change of the rear wheel demand distribution ratio Dr* (an undesirable circumstance where the control of the hydraulic brake cannot sufficiently follow the torque instruction Tbf*, Tbr*, etc.) can be suppressed. As a result, the reduction of the stability of the travel posture of the vehicle can be suppressed.

Figure 4:
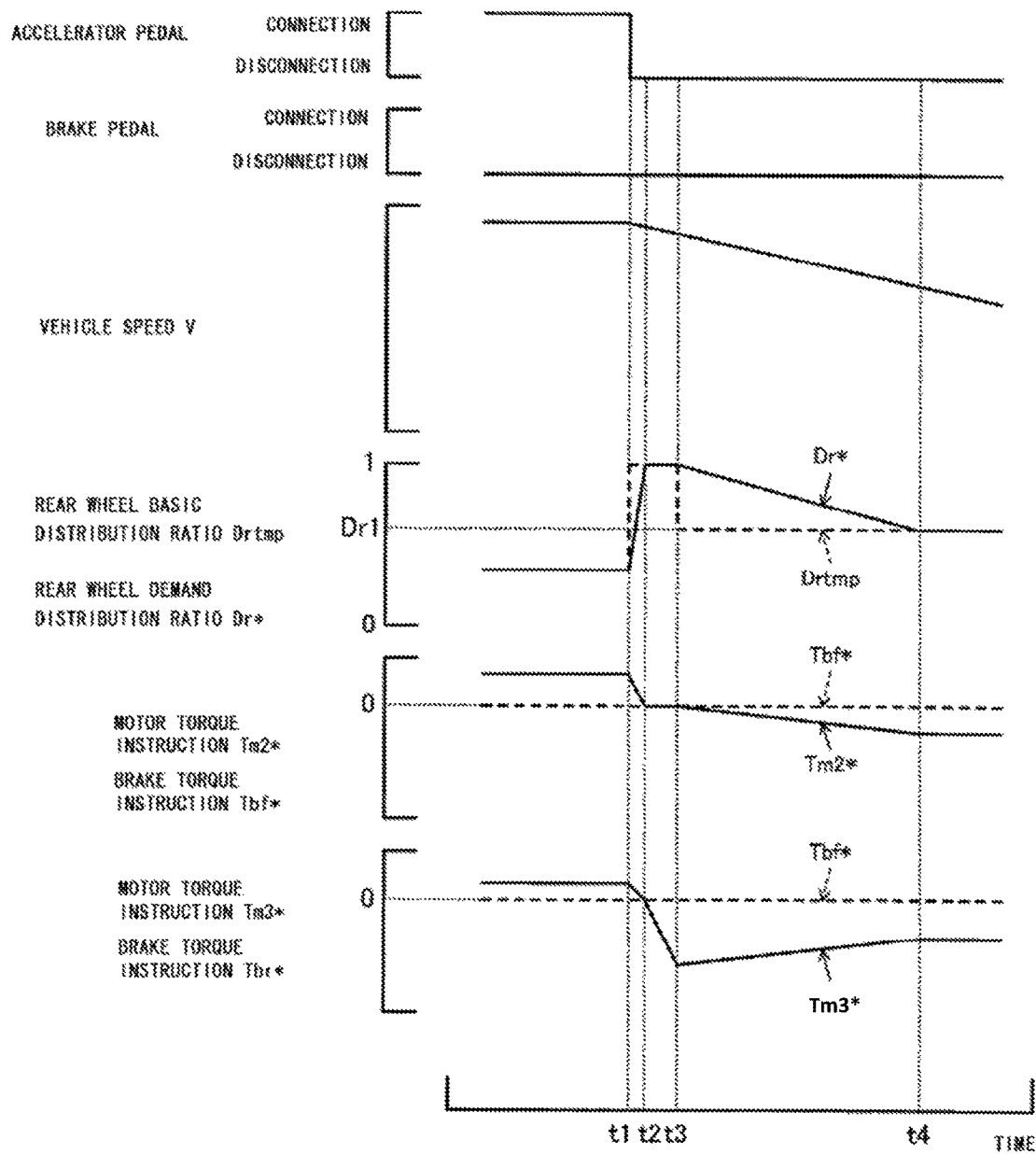
FIG. 4 is an explanatory view showing an example of change conditions along with time of a state of an accelerator pedal 83, a state of a brake pedal 85, a vehicle speed V, a rear wheel basic distribution ratio Drtmp, a rear wheel demand distribution ratio Dr*, a torque instruction Tm2* of a motor MG2, a hydraulic brake torque instruction Tbf* on a side of a front wheel 38a, 38b, a torque instruction Tm3* of a motor MG3, and a hydraulic brake torque instruction Tbr* of a rear wheel 38c, 38d.
Figure 5:
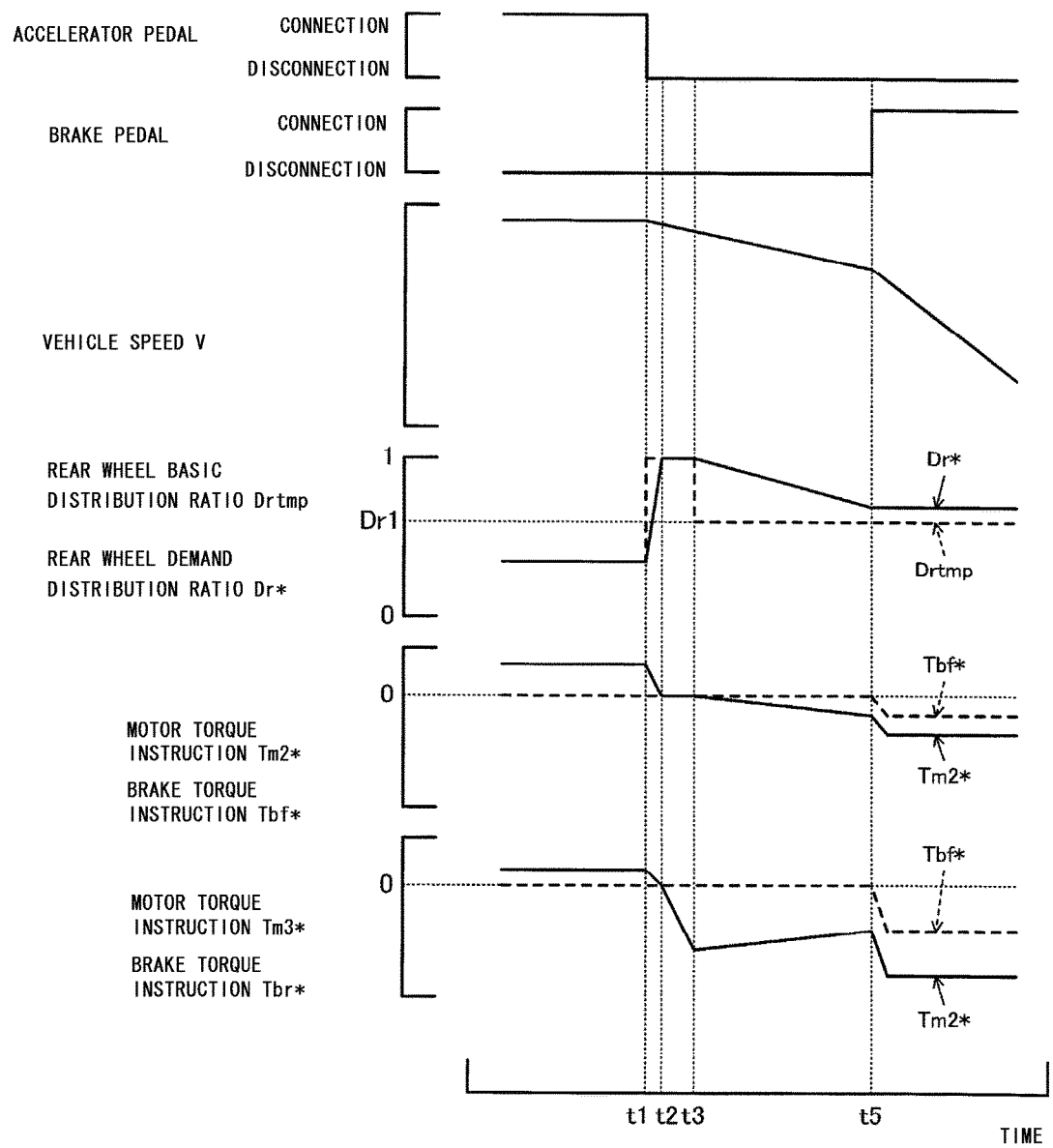
FIG. 5 is an explanatory view showing an example of change conditions along with time of a state of an accelerator pedal 83, a state of a brake pedal 85, a vehicle speed V, a rear wheel basic distribution ratio Drtmp, a rear wheel demand distribution ratio Dr*, a torque instruction Tm2* of a motor MG2, a hydraulic brake torque instruction Tbf* on a side of a front wheel 38a, 38b, a torque instruction Tm3* of a motor MG3, and a hydraulic brake torque instruction Tbr* of a rear wheel 38c, 38d.

FIG. 4 and FIG. 5 are explanatory views showing an example of change conditions along with time of a state of an accelerator pedal 83, a state of a brake pedal 85, a vehicle speed V, a rear wheel basic distribution ratio Drtmp, a rear wheel demand distribution ratio Dr*, a torque instruction Tm2* of a motor MG2, a hydraulic brake torque instruction Tbf* on a side of a front wheel 38a, 38b, a torque instruction Tm3* of a motor MG3, and a hydraulic brake torque instruction Tbr* of a rear wheel 38c, 38d. FIG. 4 shows a condition when the state changes from the accelerator ON state to the accelerator OFF and brake OFF state (a coast down) and the state lasts to an extent. FIG. 5 shows a condition when the state becomes the coast down and then becomes the brake ON state in a process of making the rear wheel demand distribution ratio Dr* change. Hereinafter, descriptions are successively given.

Under a circumstance as shown in FIG. 4, when the state changes from the state of the accelerator ON state to the accelerator OFF and brake OFF state at a time t1, the rear wheel basic distribution ratio Drtmp is made to increase from the value immediately before the prescribed transition (the value during the accelerator ON state) to the value 1. Moreover, corresponding to this, the rear wheel demand distribution ratio Dr* is made to gradually increase from the value immediately before the prescribed transition to the rear wheel basic distribution ratio Drtmp (the value 1), and the torque instruction Tm2*, Tm3* of the motor MG2, MG3 is made to gradually change. Moreover, at a time t2, the rear wheel demand distribution ratio Dr* reaches the value 1. Moreover, at a time t3, the torque instruction Tm3* of the motor MG3 reaches a value (Tdtmp·Drtmp/Gr) obtained by dividing a value obtained by multiplying the basic demand torque Tdtmp by the rear wheel basic distribution ratio Drtmp (the value 1 under this circumstance) by the gear ratio Gr of the deceleration gear 35R. Consequently, the rear wheel basic distribution ratio Drtmp is made to decrease from the value 1 to the prescribed value Dr1. Moreover, corresponding to this, the rear wheel demand distribution ratio Dr* is made to gradually decrease from the value 1 to the prescribed value Dr1, and the torque instruction Tm2*, Tm3* of the motor MG2, MG3 is made to change. After the rear wheel demand distribution ratio Dr* reaches the rear wheel basic distribution ratio Drtmp (the prescribed value Dr1) at a time t4, the rear wheel demand distribution ratio Dr* is kept to be the prescribed value Dr1. In this case, as compared with a circumstance where the rear wheel demand distribution ratio Dr* is made to directly change from a value immediately before the accelerator OFF and brake OFF state to the prescribed value Dr1, the vehicle becoming the forward tilt posture can be further suppressed by making the rear wheel demand distribution ratio Dr* change to the prescribed value Dr1 after changing from the value immediately before the prescribed transition to the value 1.

Under a circumstance as shown in FIG. 5, this circumstance is the same as that in FIG. 4 till the time t3. Then, when the brake ON state takes place at a time t5 before the rear wheel demand distribution ratio Dr* reaches the prescribed value Dr1, the rear wheel demand distribution ratio Dr* is kept to be the value immediately before the brake ON state, and corresponding to this, the torque instruction Tm2*, Tm3* of the motor MG2, MG3 and the hydraulic brake torque instruction Tbf*, Tbr* are set. Thereby, production of an undesirable circumstance caused by the change of the rear wheel demand distribution ratio Dr*, e.g., an undesirable circumstance where the control of the hydraulic brake cannot follow the torque instruction Tbf*, Tbr*, can be suppressed. As a result, the reduction of the stability of the travel posture of the vehicle can be suppressed.

In the hybrid vehicle 20 of the embodiment described above, during the prescribed transition from the accelerator ON state to the accelerator OFF and brake OFF state, the rear wheel demand distribution ratio Dr* is made to change to the prescribed value Dr1 after changing from the value immediately before the prescribed transition (the value during the accelerator ON state) to the value 1 larger than the prescribed value Dr1. Thereby, the vehicle becoming the forward tilt posture can be further suppressed as compared with the circumstance where the rear wheel demand distribution ratio Dr* is made to directly change to the prescribed value Dr1. As a result, the reduction of the stability of the travel posture of the vehicle can be further suppressed.

Moreover, in the hybrid vehicle 20 of the embodiment, the value corresponding to the gravity center position (static load gravity center position) of the vehicle during parking is used as the prescribed value Dr1. Thereby, when the accelerator OFF and brake OFF state lasts, the travel posture of the vehicle can be made to be more stable.

Moreover, in the hybrid vehicle 20 of the embodiment, in a process of making the rear wheel demand distribution ratio Dr* change during the accelerator OFF and brake OFF state, when the brake ON state takes place, the rear wheel demand distribution ratio Dr* is kept to be the value immediately before the brake ON state. Thereby, an undesirable circumstance caused by the change of the rear wheel demand distribution ratio Dr*, e.g., an undesirable circumstance where the control of the hydraulic brake cannot sufficiently follow the torque instruction Tbf*, Tbr*, can be suppressed. As a result, the reduction of the stability of the travel posture of the vehicle can be suppressed.

Figure 6:
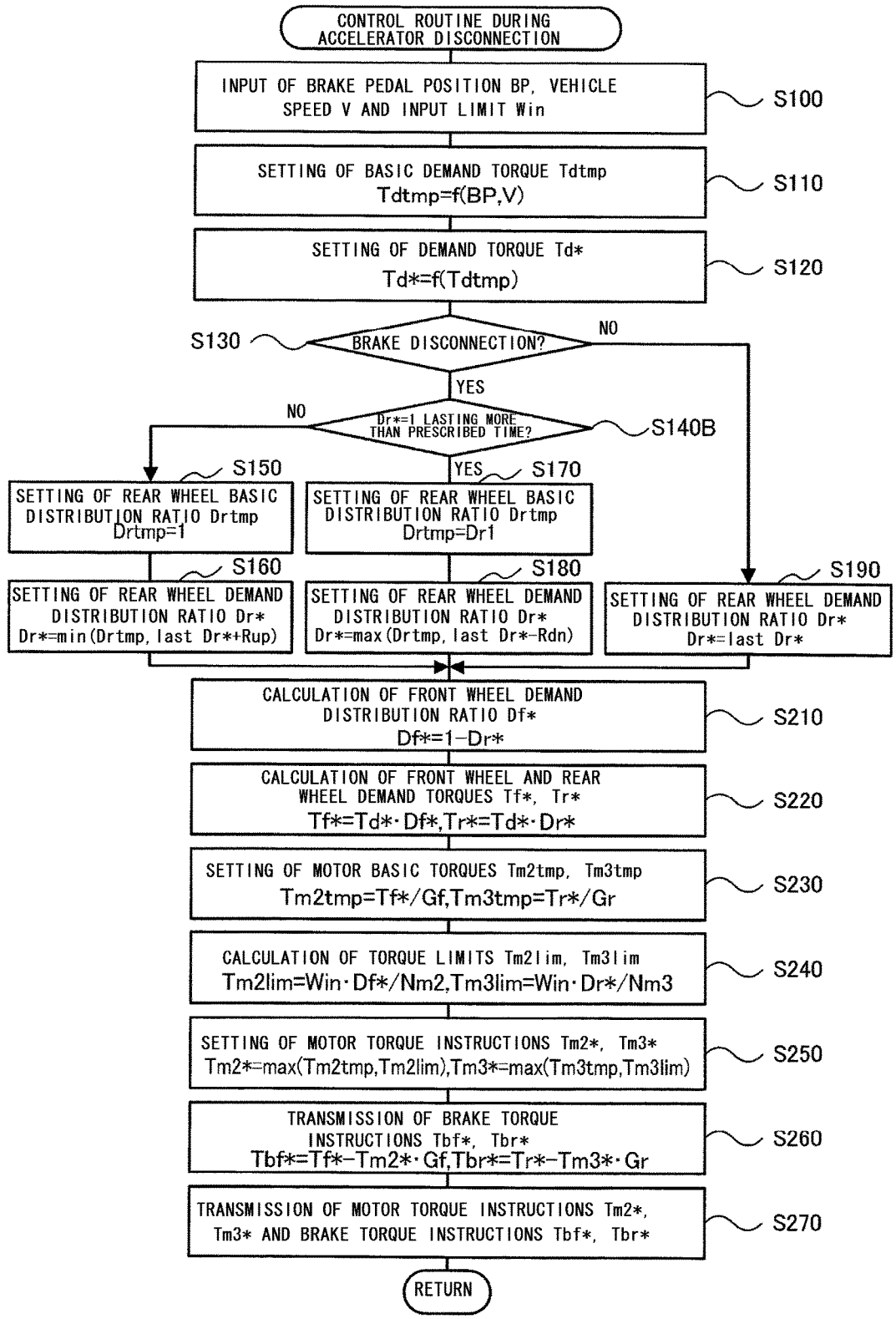
FIG. 6 is a flowchart showing an example of a control routine during an accelerator OFF state performed by an HVECU 70 of the embodiment.

In the hybrid vehicle 20 of the embodiment, during the accelerator OFF state, the HVECU 70 performs the above-mentioned control routine during the accelerator OFF state in FIG. 2, but can also perform a control routine during the accelerator OFF state in FIG. 6 instead. Here, the routine in FIG. 6 is the same as the routine in FIG. 2 in terms of other points than a point of performing a processing in Step S140B instead of a processing in Step S140 of the routine in FIG. 2. Thus, in the routine in FIG. 6, with respect to a processing the same as that in the routine in FIG. 2, the same step numbers are marked, and detailed descriptions thereof are omitted.

In the routine in FIG. 6, when it is judged in Step S130 that the state is the brake ON state, it is judged whether or not a state where the rear wheel demand distribution ratio Dr* is the value 1 lasts more than a prescribed time tref (Step S140B). Moreover, when it is judged that the state where the rear wheel demand distribution ratio Dr* is the value 1 lasts less than the prescribed time tref, processings after Step S150 are performed. On the other hand, when it is judged that the state where the rear wheel demand distribution ratio Dr* is the value 1 lasts more than the prescribed time tref, processings after Step S170 are performed.

Here, the prescribed time tref can use, for example, a supposed time required till the rear wheel demand torque Tr* reaches the value (Tdtmp·Drtmp) after the rear wheel demand distribution ratio Dr* becomes the value 1 or a time slightly longer than the above-mentioned time.

Under this circumstance, during the prescribed transition, like that in the embodiment, the rear wheel demand distribution ratio Dr* is made to change to the prescribed value Dr1 after changing from the value immediately before the prescribed transition (the value during the accelerator ON state) to the value 1, so an effect the same as that of the embodiment can be achieved.

In the hybrid vehicle 20 of the embodiment, in the process of making the rear wheel demand distribution ratio Dr* change during the accelerator OFF and brake OFF state, when the brake ON state takes place, the rear wheel demand distribution ratio Dr* is kept to be the value immediately before the brake ON state. However, the rear wheel demand distribution ratio Dr* may be also not kept. For example, the rear wheel demand distribution ratio Dr* may be changed to a value corresponding to the brake pedal position BP and be kept. Under this circumstance, the rear wheel basic distribution ratio Drtmp is set in a trend that the more the brake pedal position BP is larger than the value 0, the more the rear wheel basic distribution ratio Drtmp is larger than the prescribed value Dr1, and the rear wheel demand distribution ratio Dr* is changed to the rear wheel basic distribution ratio Drtmp and be kept. The larger the brake pedal position BP is, the larger a deceleration of the vehicle is, and the more likely the vehicle becomes the forward tilt posture. Thus, the vehicle becoming the forward tilt posture can be further suppressed by setting the rear wheel demand distribution ratio Dr* in this way.

In the hybrid vehicle 20 of the embodiment, during the prescribed transition, the rear wheel demand distribution ratio Dr* is made to change to the prescribed value Dr1 after changing to the value 1. However, the rear wheel demand distribution ratio Dr* can be also made to change to the prescribed value Dr1 after changing to a prescribed value Dr2 (e.g., 0.9 or 0.95) slightly smaller than the value 1. Under this circumstance, in the routine in FIG. 2, in Step S150, it is allowed as long as the rear wheel basic distribution ratio Drtmp is set to the prescribed value Dr2 instead of the value 1, and the prescribed situation used in Step S140 is a situation where after the prescribed transition, the brake ON state does not take place and the rear wheel demand torque Tr* (=Td*·Dr*) reaches a value (Tdtmp·Dr2).

In the hybrid vehicle 20 of the embodiment, with respect to the rate value Rup and the rate value Rdn in order to make the rear wheel demand distribution ratio Dr* change during the accelerator OFF and brake OFF state, the rate value Rup is larger than the rate value Rdn, but the rate value Rup and the rate value Rdn can also use the same value.

In the hybrid vehicle 20 of the embodiment, the basic demand torque Tdtmp is subjected to the rate processing to set the demand torque Td*. However, the basic demand torque Tdtmp may be also subjected to the slow change processing such as the smoothing processing, other than the rate processing to set the demand torque Td*. Moreover, in the embodiment, the rear wheel basic distribution ratio Drtmp is subjected to the rate processing to set the rear wheel demand distribution ratio Dr*. However, the rear wheel basic distribution ratio Drtmp may be also subjected to the slow change processing such as the smoothing processing, other than the rate processing to set the rear wheel demand distribution ratio Dr*.

In the hybrid vehicle 20 of the embodiment, the drive shaft 36F is connected to the front wheels 38a, 38b via the deceleration gear 35F, and the drive shaft 36R is connected to the rear wheels 38c, 38d via the deceleration gear 35R. However, the drive shaft 36F may be also connected to the front wheels 38a, 38b without the deceleration gear 35F.

Moreover, the drive shaft 36F may be also connected to the front wheels 38a, 38b via a transmission instead of the deceleration gear 35F. In addition, the drive shaft 36R may be also connected to the rear wheels 38c, 38d without the deceleration gear 35R. Moreover, the drive shaft 36R may be also connected to the rear wheels 38c, 38d via a transmission instead of the deceleration gear 35R.

Figure 7:
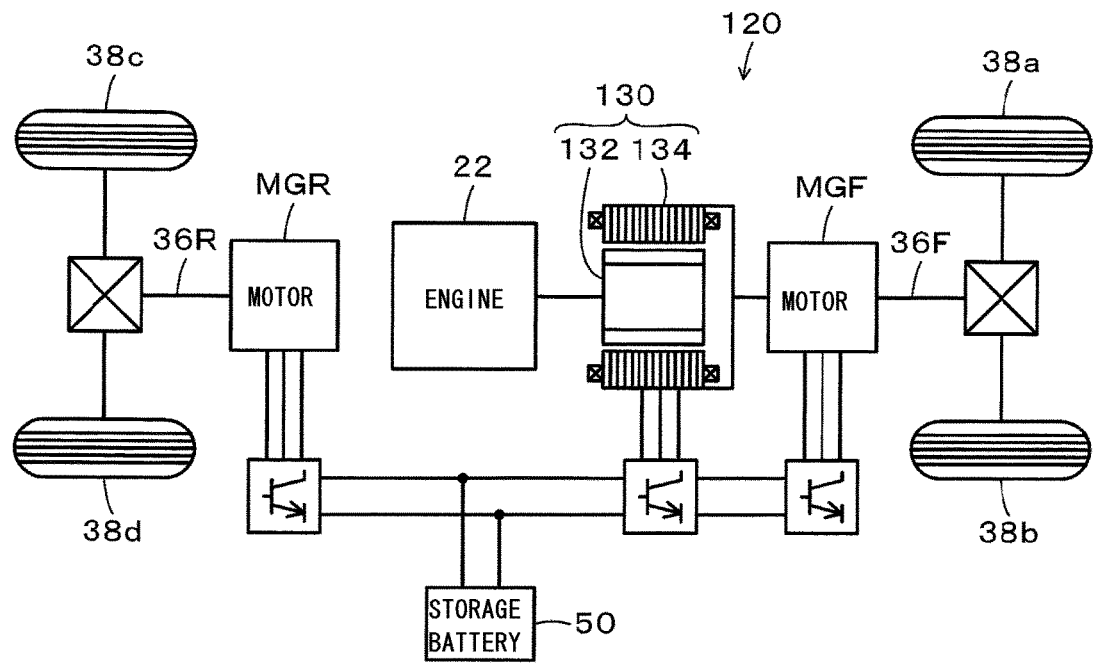
FIG. 7 a schematic structure diagram showing a structure of a hybrid vehicle 120 of a modified embodiment.
Figure 8:
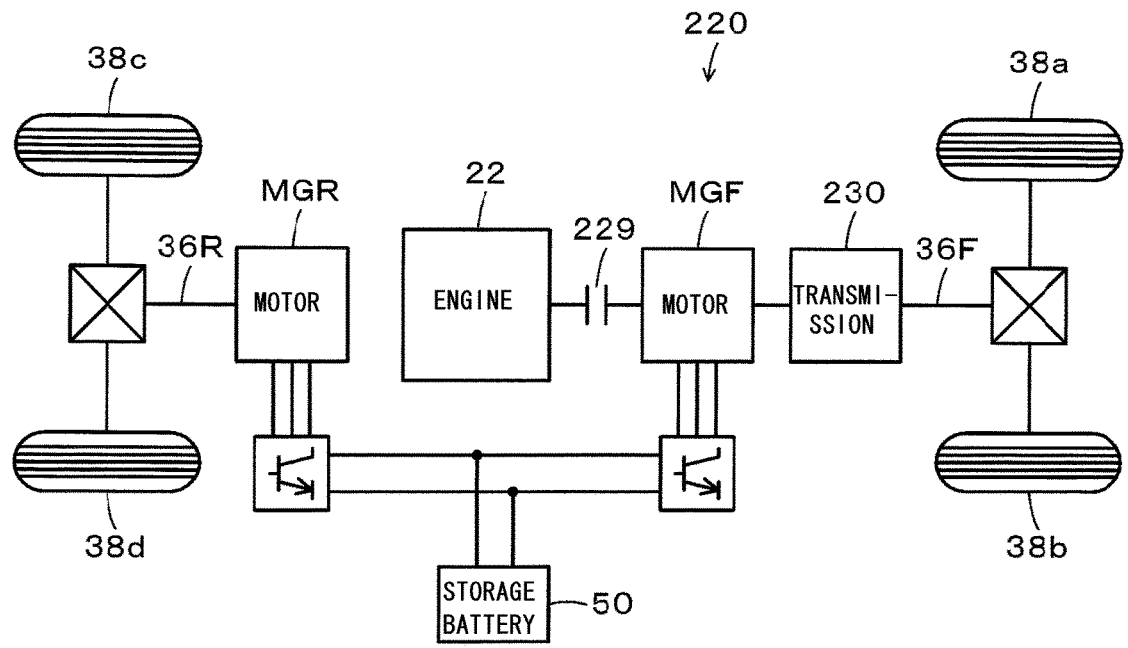
FIG. 8 a schematic structure diagram showing a structure of a hybrid vehicle 220 of a modified embodiment.
Figure 9:
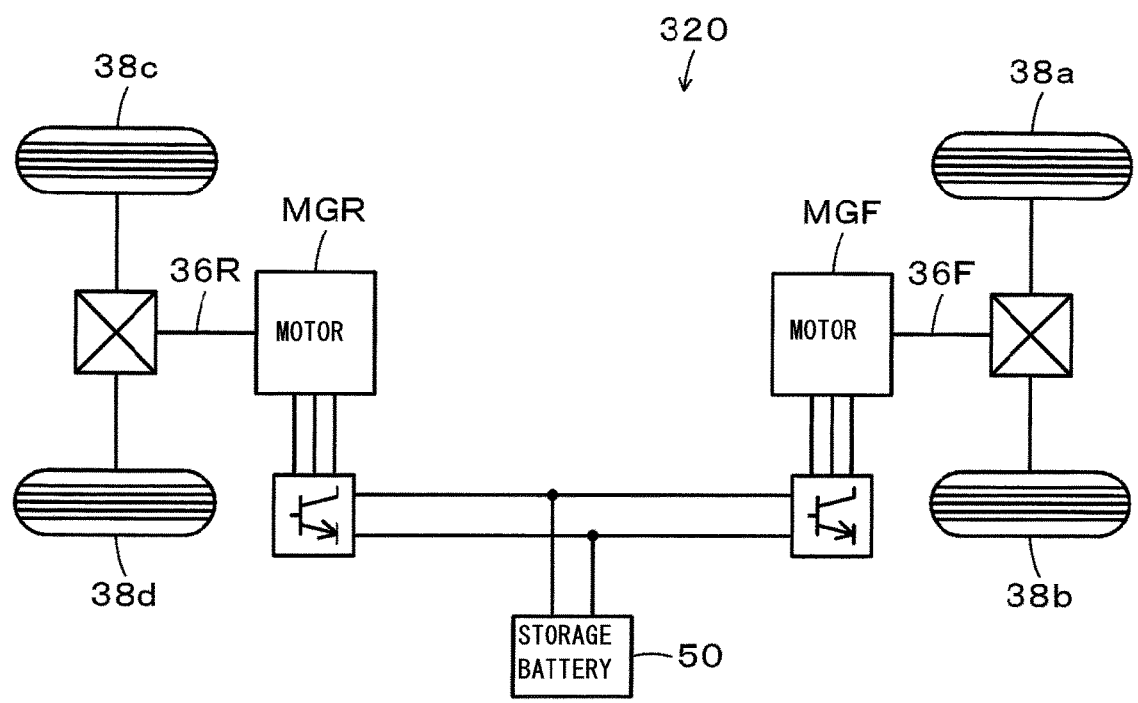
FIG. 9 is a schematic structure diagram showing a structure of an electric vehicle 320 of a modified embodiment.

In the embodiment, a structure of the hybrid vehicle 20 mentioned below is formed, i.e., the hybrid vehicle 20 includes: the engine 22 and the motor MG1 connected to the drive shaft 36F, which is connected with the front wheels 38a, 38b via the deceleration gear 35F, via the planetary gear 30; the motor MG2 connected with the drive shaft 36F; and the motor MG3 connected to the drive shaft 36R that is connected with the rear wheels 38c, 38d via the deceleration gear 35R. However, a structure of a hybrid vehicle 120 mentioned below can be also formed as shown in FIG. 7, i.e., the hybrid vehicle 120 includes: the engine 22; a spinner motor 130 having an inner rotor 132 connected with the engine 22 and an outer rotor 134 connected with the drive shaft 36F for transferring a part of motive power from the engine 22 to the drive shaft 36F and converting remaining motive power into electric power; a motor MGF connected with the drive shaft 36F; and a motor MGR connected with the drive shaft 36R. Moreover, a structure of a hybrid vehicle 220 mentioned below can be also formed as shown in FIG. 8, i.e., the hybrid vehicle 220 includes: the engine 22; the motor MGF connected with the engine 22 via a clutch 229; a transmission 230 connected with the motor MGF and the drive shaft 36F; and the motor MGR connected with the drive shaft 36R. Moreover, a structure of an electric vehicle 320 mentioned below can be also formed as shown in FIG. 9, i.e., the electric vehicle 320 includes: the motor MGF connected with the drive shaft 36F; and the motor MGR connected with the drive shaft 36R.

A corresponding relationship between main elements in the embodiments and main elements of the invention recorded in the part of means for solving problems is described. In the embodiments, the motor MG2 corresponds to "a motor for a front wheel", the motor MG3 corresponds to "a motor for a rear wheel", the battery 50 corresponds to "a battery", the HVECU 70 that performs the control routine during the accelerator OFF state in FIG. 2 and the motor ECU 40 that controls the motor MG2, MG3 based on the torque instruction Tm2*, Tm3* from the HVECU 70 correspond to "a control unit".

It should be noted that the corresponding relationship between the main elements in the embodiments and the main elements of the invention recorded in the part of means for solving problems is used for specifically describing an example of modes in which the embodiments carry out the invention recorded in the part of means for solving problems, so the elements of the invention recorded in the part of means for solving problems are not limited. That is, explanations of the invention recorded in the part of means for solving problems should be given based on the contents recorded in the part, and the embodiments are only specific examples of the invention recorded in the part of means for solving problems.

Hereinbefore, embodiments are used to describe the modes for carrying out the invention, but the invention is not limited by such embodiments, and the invention can be certainly carried out in various modes within a range not breaking away from the concept of the invention.

The invention can be applied to a manufacturing industry of motor vehicles and the like.

What is claimed is:

1. A motor vehicle, comprising:
a front wheel motor configured to input motive power to a front wheel and receive motive power output from the front wheel;
a rear wheel motor configured to input motive power to a rear wheel and receive motive power output from the rear wheel;
a battery configured to transmit electric power to the front wheel motor and rear wheel motor or receive electric power from the front wheel motor and the rear wheel motor; and
a control unit configured to control a torque distribution ratio of the front wheel motor and the rear wheel motor during operation of the motor vehicle, the torque distribution ratio being a ratio of a torque applied by the rear wheel motor to a torque applied by both the front wheel motor and rear wheel motor,
wherein during coasting of the motor vehicle, which is upon a release of an accelerator of the motor vehicle and a non-engagement of a brake of the motor vehicle:
the control unit initially increases the torque distribution ratio to a first torque distribution ratio, and
after a predetermined amount of time of coasting of the motor vehicle, the control unit decreases the torque distribution ratio to a second torque distribution ratio, the second torque distribution ratio resulting from an increase in torque applied by the front wheel motor.

2. The motor vehicle according to claim 1, wherein the first value of the torque distribution ratio corresponds to a center of gravity of the motor vehicle during movement that is substantially the same as a center of gravity of the motor vehicle when the motor vehicle is stationary.

3. The motor vehicle according to claim 1, wherein the first torque distribution ratio is 1.

4. The motor vehicle according to claim 1, wherein during coasting, the control unit decreases the torque distribution ratio from the first torque distribution ratio to the second torque distribution ratio in a longer period of time than when the control unit initially increased the torque distribution ratio to the first torque distribution ratio.

5. The motor vehicle according to claim 1,
wherein upon engagement of the brake, the control unit maintains the torque distribution ratio fixed at a same value of the torque distribution ratio as immediately before the brake was engaged.

6. The motor vehicle according to claim 1, further comprising:
an engine;
a generator; and
a planetary gear having three rotary elements coupled to a drive shaft, the drive shaft coupled to the front wheel, an output shaft of the engine, and a rotating shaft of the generator.

7. The motor vehicle according to claim 1, further comprising:
an engine; and
a spinner motor, the spinner motor having an inner rotor coupled to the engine and an outer rotor coupled to a drive shaft, the drive shaft coupled to the front wheel, and the spinner motor configured to convert motive power from the engine into electric power.

8. The motor vehicle according to claim 1, further comprising:
an engine;
a clutch disposed between the engine and the front wheel motor; and
a transmission coupled to the front wheel motor and a drive shaft, the drive shaft coupled to the front wheel.

* * * * *